United States Patent [19]
Seki et al.

[11] Patent Number: 5,668,677
[45] Date of Patent: Sep. 16, 1997

[54] APPARATUS FOR RECORDING AND REPRODUCING VARIABLE LENGTH CODES

[75] Inventors: Takahito Seki; Yukio Kubota, both of Kanagawa, Japan

[73] Assignee: Sony Corporation, Tokyo, Japan

[21] Appl. No.: 220,172

[22] Filed: Mar. 30, 1994

[30] Foreign Application Priority Data

Mar. 30, 1993 [JP] Japan ................... 5-095366

[51] Int. Cl.$^6$ ................. G11B 5/09; G11B 5/00
[52] U.S. Cl. .................. 360/48; 360/32; 386/33; 386/39; 386/40; 386/111
[58] Field of Search ............... 360/19.1, 32, 48; 358/325, 343; 386/33, 39, 40, 96, 101, 104, 109, 111, 112, 124

[56] References Cited

U.S. PATENT DOCUMENTS

| | | | |
|---|---|---|---|
| 5,175,631 | 12/1992 | Juri et al. | 358/335 |
| 5,218,454 | 6/1993 | Nagawasa et al. | 358/343 |
| 5,289,277 | 2/1994 | Blanchard et al. | 348/441 |
| 5,335,117 | 8/1994 | Park et al. | 360/32 |
| 5,381,275 | 1/1995 | Nitta et al. | 358/335 |
| 5,434,673 | 7/1995 | Inoue et al. | 360/32 |

FOREIGN PATENT DOCUMENTS

| | | |
|---|---|---|
| 0553650A1 | 8/1993 | European Pat. Off. . |
| 4330040A1 | 3/1994 | Germany . |
| 2075792 A | 11/1981 | United Kingdom . |

OTHER PUBLICATIONS

Patent Abstracts of Japan vol. 018, No. 275 (E–1553), May 25, 1994 & JP 06046369–A (Hitachi LTD) Feb. 18, 1994 *abstract*.

*Primary Examiner*—Aristotelis Psitos
*Assistant Examiner*—Regina Y. Neal
*Attorney, Agent, or Firm*—William S. Frommer; Alvin Sinderbrand

[57] ABSTRACT

A digital signal recording and reproducing apparatus are disclosed which can record digital data of the advanced television (ATV) system or some other digital data onto a recording medium without the necessity of displacing recording areas for sub codes of the recording medium and can thus make effective use of the recording capacity of the recording medium. When an ordinary television signal is to be recorded, the length of the Inter Block Gap IBG and amble areas between an audio signal recording area and a video signal recording area is set to an integral number of times the length of a synchronizing block of a digital audio signal and a digital video signal. When data of the ATV system or like data are to be recorded, the data are recorded continuously from the audio signal recording area to the video signal recording area.

4 Claims, 5 Drawing Sheets

APPARATUS FOR RECORDING AND REPRODUCING VARIABLE LENGTH CODES

BACKGROUND OF THE INVENTION

1. Field of the Invention

This invention relates to an apparatus for recording and reproducing a digital signal such as a digital video signal or a digital audio signal onto and from a track of a recording medium.

2. Description of the Related Art

An apparatus has been proposed and is disclosed, for example, in EP 0,553,650 A1 wherein an oblique track is formed on a magnetic tape wrapped around a rotary drum and a digital signal such as a digital video signal or a digital audio signal is recorded and reproduced in a time divisional relationship onto or from a sectioned area of the track by means of a rotary head.

FIG. 3 shows a construction of an exemplary one of conventional digital signal recording and reproducing apparatus of the type mentioned. Referring to FIG. 3, the digital signal recording and reproducing apparatus shown includes a recording processing circuit 1 to which a brightness signal Y and a pair of color difference signals PR and PB which constitute analog component video signals are inputted. The signals are processed by various processes including analog to digital conversion, blocking, shuffling, DCT (discrete cosine transform), compression by quantization and variable length coding, and framing by the recording processing circuit 1, and then supplied to a parity generation circuit 3.

The parity generation circuit 3 adds a parity of the product code construction to the data supplied thereto, and the resulted data from the parity generation circuit 3 are supplied to a SYNC and ID generation circuit 4, by which a synchronizing code and an ID are added to the data. The data from the SYNC and ID generation circuit 4 are processed by parallel to serial conversion and conversion into recording codes by a channel encoder 5 and are then amplified by an amplifier 6, whereafter they are supplied to a magnetic head 8 by way of a recording side terminal R of a switching circuit 7 so that they are recorded onto a magnetic tape 9. Here, a digital video signal for one frame is recorded as a plurality of (for example, 10 in the NTSC system, 12 in the PAL system and 20 in the HDTV system) oblique tracks.

It is to be noted that, though not shown, a digital audio signal, a sub code signal and an ATF pilot signal are supplied to the channel encoder 5 and recorded in a time divisional relationship with the digital video signal onto each track on the magnetic tape 9 by the magnetic head 8.

Upon reproduction, data reproduced from the magnetic tape 9 by the magnetic head 8 are supplied by way of a terminal P of the switching circuit 7 on the reproduction side to an amplifier and equalizer 10, by which amplification and correction for the frequency characteristic are performed for the data. The data from the amplifier and equalizer 10 are then processed by decoding into a recording code and serial to parallel conversion by a channel encoder 11 and then supplied to a SYNC and ID detection circuit 12. The ID detection circuit 12 thus detects a synchronizing code and an ID (identification) and supplies them together with the reproduction data to a TBC 13. The TBC 13 removes a time base variation from the data supplied thereto, and the resulted data from the TBC 13 are processed by error correction processing using a product code by an ECC circuit 14 and then supplied to a reproduction processing circuit 16.

The digital video signal supplied to the reproduction processing circuit 16 is processed by various processes including deframing, variable length decoding, dequantization, inverse DCT, deshuffling and deblocking and then converted into analog component video signals by the reproduction processing circuit 16 so that the signals are outputted as a brightness signal Y and a pair of color difference signals PR and PB from the digital signal recording and reproducing apparatus.

It is to be noted that, though not shown, also a digital audio signal and a sub code signal outputted from the ECC circuit 14 are processed similarly. Further, an ATF pilot signal is separated from the output of the channel decoder 11 and supplied to an ATF circuit not shown, by which tracking correction is performed.

FIG. 4 shows an example of a track format employed in the digital signal recording and reproducing apparatus constructed in such a manner as described above. Referring to FIG. 4, the left end of the track shown is the head entrance (incoming) side while the right end is the head exit (outgoing) side. No data are recorded in any one of margins 1 and 2 and IBGs (inter block gaps) which are areas indicated by slanting lines. A pulse signal of a frequency, for example, equal to the bit frequency of data is recorded in a T-amble (track-amble) area added to the front of a first ATF area (ATF1) and amble areas (preamble and postamble areas) added to the opposite ends of a data recording area, and is utilized for locking of a PLL circuit for extraction of bit clocks provided on the reproduction side. The margin 1 and the margin 2 provided at the opposite ends of the track are provided to cope with a case wherein the position at which the track is formed is displaced by jitters. Meanwhile, the IBGs are areas for assuring margins for postrecording.

The first ATF area (ATF 1) and the second ATF area (ATF 2) into which a pilot signal for ATF and a timing synchronizing signal for postrecording are recorded are provided adjacent the margins 1 and 2, respectively. Further, in order of the scanning direction of a head from the first ATF area, a recording area for an audio signal, a recording area for a video signal, a recording area for sub codes and the second AFT area are provided. Data such as an index and a time code for a high speed search are recorded in the sub code recording area. The numeral indicating the length of each area represents the number of bytes.

FIGS. 5(a) to 5(c) show an example of a one synchronizing block and framing formats of a digital video signal and a digital audio signal. In FIGS. 5(a) to 5(c), each numeral represents the number of bytes.

In particular, FIG. 5(a) shows one synchronizing block. As seen in FIG. 5(a), a horizontal parity of 8 bytes is added to the rear of digital video data or digital audio data of 78 bytes while a synchronizing code of 2 bytes and an ID of 3 bytes are added to the front of the digital video data or digital audio data. The ID has information for identification of a synchronizing block number and a type of the data. Subsequently, a method of forming such synchronizing block will be described briefly.

FIG. 5(b) shows a framing format for a digital video signal. Referring to FIG. 5(b), video data (including quantized information and so forth) of 78 bytes in a horizontal direction are arranged by 45 in a vertical direction by the recording processing circuit 1, and horizontal parities C1 and vertical parities C2 are added to the data by the parity generation circuit 3. Further, synchronizing codes and IDs are added to the data by the SYNC and ID generation circuit 4. Then, the resulted data are converted from parallel data into serial data by the channel encoder 5 and then recorded for each synchronizing block shown in FIG. 5(a). Three frames in FIG. 5(b) make a digital video signal for one track.

Similarly, FIG. 5(c) shows a framing format for a digital audio signal. One frame shown in FIG. 5(c) makes a digital audio signal for one track.

An ATV (Advanced Television) system wherein HDTV (high definition television) broadcasting is realized with digital transmission is investigated. In such ATV system, an HDTV signal of approximately 1.2 Gbit/sec is compressed to 18 to 25 Mbit/sec by motion compensation inter-frame prediction, DCT, quantization and variable length coding, and synchronizing codes, headers and parities are added to the compressed signal. Then, the resulted signal is converted into a signal of a format of a packet of a fixed length of, for example, 155 or 167 bytes to transmit the same.

Meanwhile, as an international standard system for coding moving picture data at a high efficiency, an MPEG (Moving Picture Experts Group) system has been proposed. Also in the MPEG system, a picture signal is compressed to 5 to 10 Mbit/sec by motion compensation inter-frame prediction, DCT, quantization and variable length coding.

When it is tried to record digital data of the ATV system or digital data compressed in accordance with the MPEG system using such a conventional digital signal recording and reproducing apparatus as described above, if the digital data are recorded, for example, into a recording area (1,274 bytes) for a digital audio signal and another recording area (13,377 bytes) for a digital video signal for each track, then the capacity (200 bytes) of the IBG and amble portions becomes wasteful. On the other hand, if it is tried to record data also into the IBG and amble portions, then it is necessary to displace the positions of the sub code recording area and the ATF areas.

SUMMARY OF THE INVENTION

It is an object of the present invention to provide a digital signal recording and reproducing apparatus which can record digital data of the ATV system or digital data compressed in accordance with the MPEG system onto a recording medium without the necessity of displacing recording areas for sub codes and so forth of the recording medium and can thus make effective use of the recording capacity of the recording medium.

In order to attain the object described above, according to the present invention, there is provided a digital magnetic recording and/or reproducing apparatus which converts an input digital image signal into high efficiency codes and further into variable length codes and then records the thus obtained variable length codes, which comprises buffering means for reducing the amount of data of the variable length coding output for a predetermined period shorter than one frame period to an amount smaller than an aimed value and quantizing the image data converted into the high frequency codes with a particular quantization step, synchronizing block conversion means for converting the variable length coding output for the predetermined period into a construction of synchronizing blocks defining the data area length of the synchronizing blocks so that the variable length coding output for the predetermined period whose data amount has been controlled by the buffering means may be included in an integral number of synchronizing blocks, information addition means for adding information of the quantization step for each of the synchronizing blocks, and control means for recording an integral number of units of the image data quantized by the buffering means onto a track of a recording medium and recording or reproducing a plurality of different digital signals having a same synchronizing block length in a spaced relationship from each other by a distance equal to an integral number of times the synchronizing block length on the track of the recording medium.

With the digital signal recording and reproducing apparatus, a plurality of different digital signals having a same synchronizing block length such as, for example, a digital video signal and a digital audio signal are recorded and reproduced onto and from a track in a spaced relationship from each other by a distance equal to an integral number of times the synchronizing block length. Accordingly, some other digital signal such as, for example, digital data of the ATV system can be continuously recorded onto and reproduced from the areas into and from which the plurality of digital signals are to be recorded and reproduced and a gap between the areas.

Consequently, with the digital signal recording and reproducing apparatus, even when digital data of the ATV system or digital data compressed in accordance with the MPEG system are to be recorded, it is not necessary to displace an ATF area or any other area, and accordingly, the recording capacity of the recording medium can be utilized effectively.

The above and other objects, features and advantages of the present invention will become apparent from the following description and the appended claims, taken in conjunction with the accompanying drawings.

DETAILED DESCRIPTION OF THE PREFERRED EMBODIMENT

Figure 2:
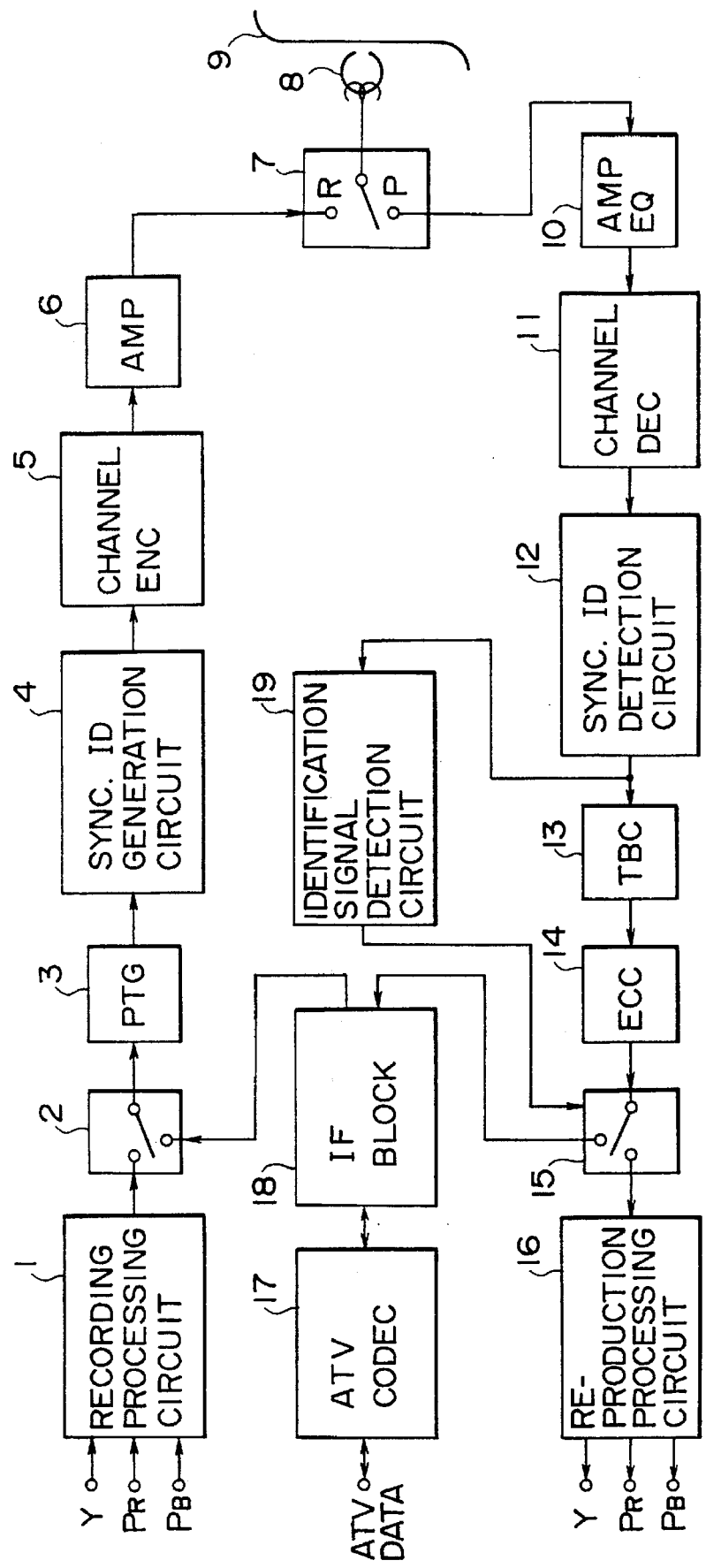
FIG. 2 is a block diagram of a digital signal recording and reproducing apparatus showing a preferred embodiment of the present invention.
Figure 3:
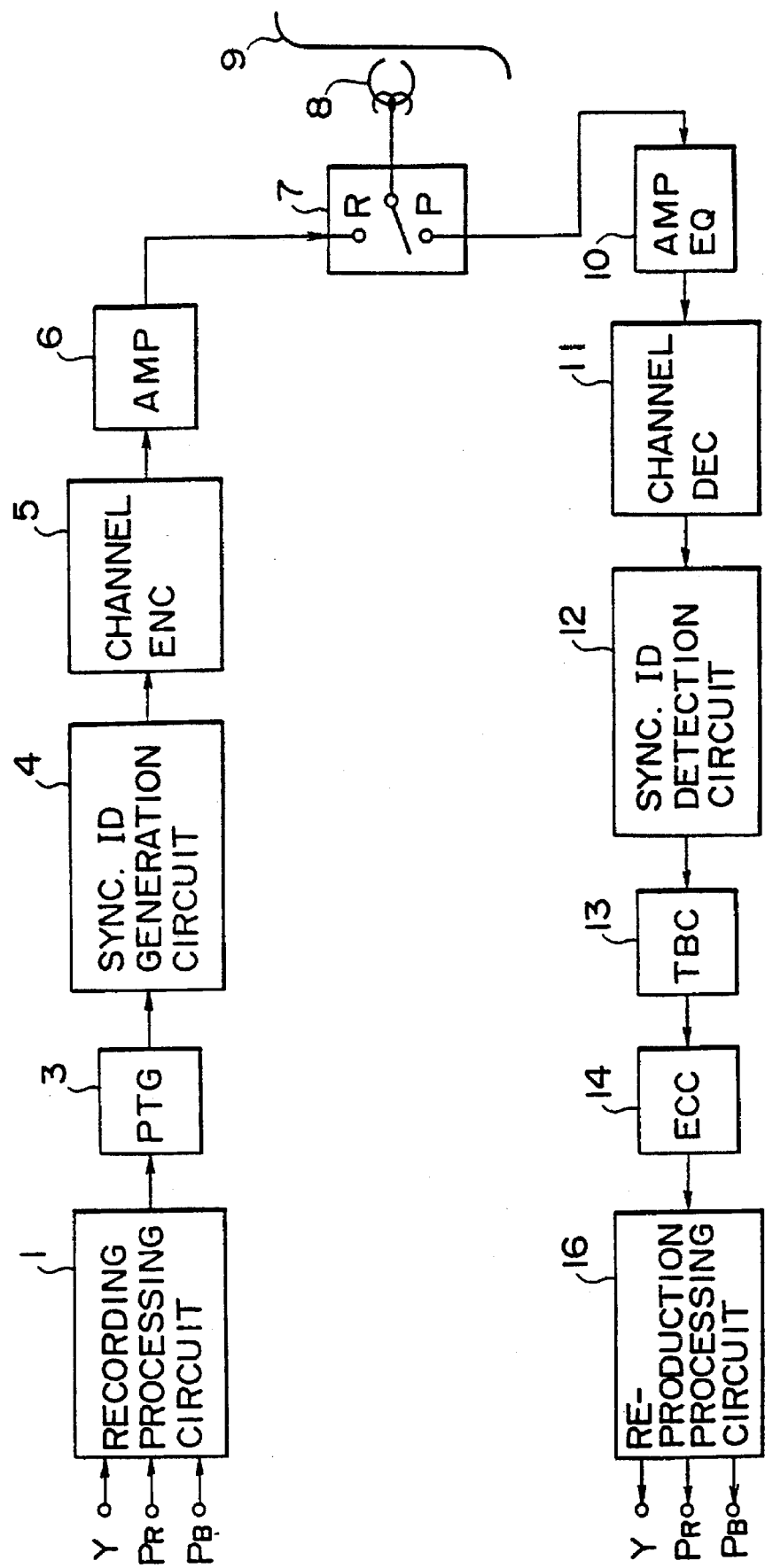
FIG. 3 is a block diagram showing an exemplary one of conventional digital signal recording and reproducing apparatus.
Figure 4:
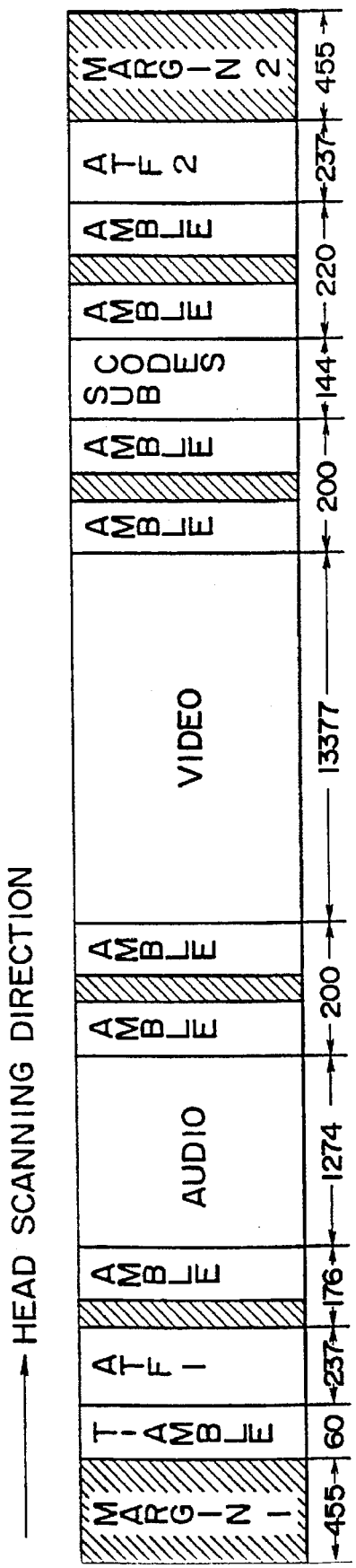
FIG. 4 is a diagram showing an example of a track format employed in the digital signal recording and reproducing apparatus shown in FIG. 3.

Referring first to FIG. 2, there is shown a digital signal recording and reproducing apparatus according to a preferred embodiment of the present invention. It is to be noted that like elements to those of FIG. 3 are denoted by like reference numerals and overlapping description of details thereof is omitted herein to avoid redundancy.

In particular, similarly to the conventional digital signal recording and reproducing apparatus described hereinabove with reference to FIG. 3, the digital signal recording and reproducing apparatus of the present embodiment includes, in a recording system thereof, a recording processing circuit 1, a parity generation circuit 3, a SYNC and ID generation circuit 4, a channel encoder 5 and an amplifier 6, and in a reproduction system thereof, an amplifier and equalizer 10, a channel decoder 11, a SYNC and ID detection circuit 12, a TBC 13, an ECC circuit 14 and a reproduction processing circuit 16.

The digital signal recording and reproducing apparatus shown can record video signals supplied to the recording processing circuit 1 and an ATV signal inputted by way of an ATV codec (coder-decoder) 17 and an interface block 18.

First, analog component video signals supplied to the recording processing circuit 1 are supplied to the parity generation circuit 3 by way of a switching circuit 2. Selection of a terminal of the switching circuit 2 is performed, for example, in response to an instruction inputted thereto by way of an operation panel (not shown) by a user based on data to be recorded. Processing by the recording processing circuit 1 and processing of the components from the parity generation circuit 3 to the amplifier 6 are basically same as the processing of the corresponding components of the digital signal recording and reproducing apparatus described hereinabove with reference to FIG. 3 except the track format of data processed.

Also processing of data reproduced from the magnetic tape 9 upon reproduction until they are supplied to the ECC circuit 14 is basically same as that in the digital signal recording and reproducing apparatus of FIG. 3. Data outputted from the ECC circuit 14 are supplied to the reproduction processing circuit 16 by way of a switching circuit 15. Selection of a terminal Of the switching circuit 15 may be performed in response to an instruction inputted by a user similarly as upon recording. However, it is convenient if, for example, identification data are recorded, upon recording, into a sub code area or an ATF area and are then reproduced, upon reproduction, by an identification signal detection circuit 19 so that the switching circuit 15 may be automatically changed over in response to the identification data. Also processing of the reproduction processing circuit 16 is basically similar to that in the digital signal recording and reproducing apparatus of FIG. 3.

Figure 1A:
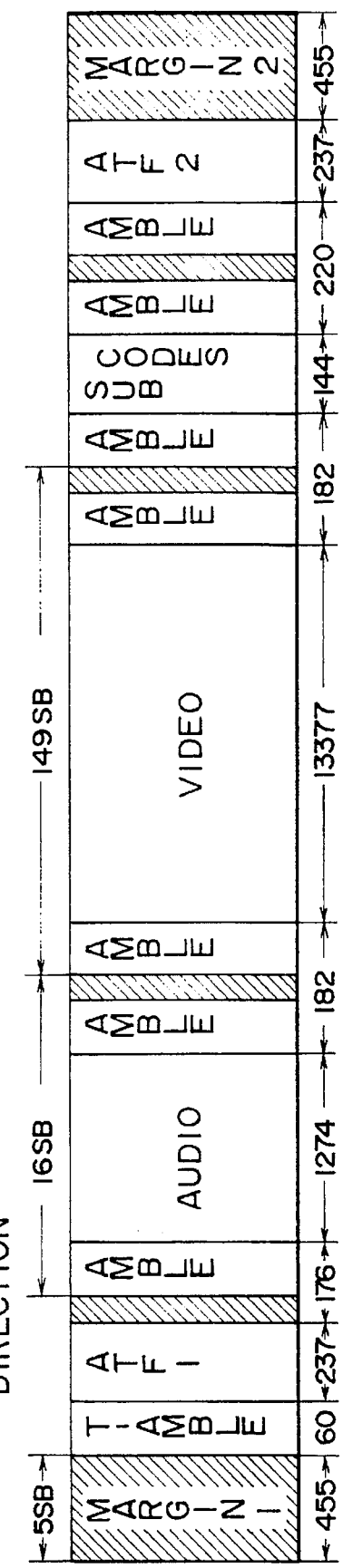
FIGS. 1(a) and 1(b) are diagrams showing an example of a track format employed in a digital signal recording and reproducing apparatus to which the present invention is applied.

FIG. 1(a) diagrammatically shows an example of a track format of data recorded in such a manner as described above. As seen from FIG. 1(a), in the present embodiment, the sum of amble areas and an IBG formed between a recording area for a digital audio signal and a recording area for a digital video signal and the sum of amble areas and an IBG formed between the recording area for a digital video signal and a recording area for a sub code signal both have a 182 byte length, which is set so as to be equal to twice the synchronizing block length (91 bytes) for a digital video signal and a digital audio signal.

Subsequently, operation of the digital signal recording and reproducing apparatus when an ATV signal is recorded and reproduced will be described. The ATV codec 17 receives a digital video signal and a digital audio signal of the ATV system supplied thereto from a circuit not shown, separates the received digital video signal and digital audio signal into important data (PD) and ordinary data (ND), and supplies the important data (PD) and the ordinary data (ND) to the interface block 18. The important data here are data of low frequency components of coefficients obtained by DCT processing of video data while the ordinary data are data of high frequency components of the coefficients.

Figure 5A:
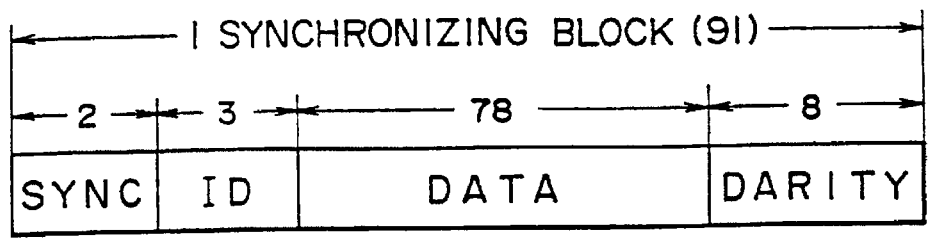
FIGS. 5(a), 5(b) and 5(c) are diagrams showing an example of one synchronizing block and framing formats of a digital video signal and a digital audio signal employed in the digital signal recording and reproducing apparatus shown in FIG. 3.
Figure 5B:
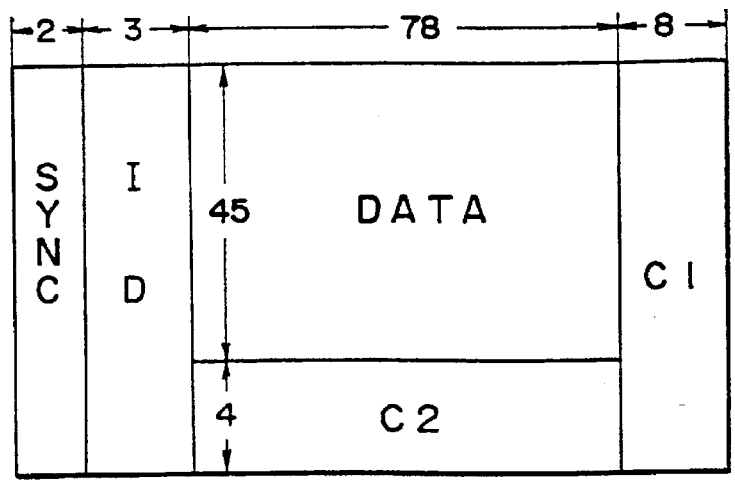
Figure 5C:
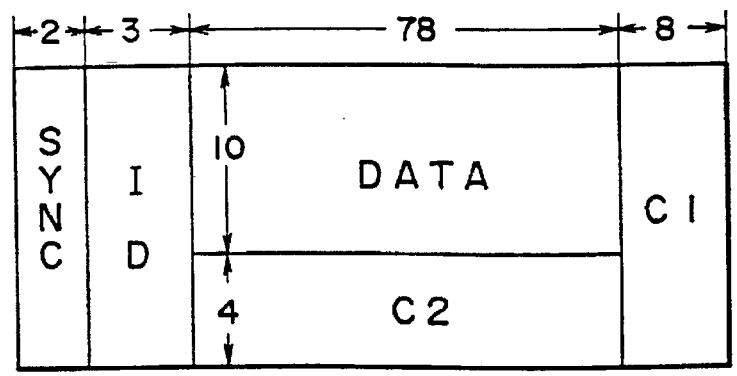

The interface block 18 builds up the important data and the ordinary data inputted thereto from the ATV codec 17 into the data of the data formats shown in FIGS. 5(b) and 5(c) and supplies the data of the formats to the parity generation circuit 3 by way of the switching circuit 2. Here, however, the important data and the ordinary data are built up so that the important data may be recorded at a central portion of a track. It is also possible to compare the transmission rate of the input data and the recording data of the digital signal recording and reproducing apparatus and control so that, when the recording rate is sufficiently high, the same important data may be recorded at two different locations at a central portion of a track. This prevents otherwise possible deterioration of the quality of a reproduction image upon variable speed reproduction.

Processing of the parity generation circuit 3 and the components following it is basically same as in the case wherein analog component video signals are recorded except the track format. Also processing of data reproduced from the magnetic tape 9 upon reproduction until they are supplied to the ECC circuit 14 is basically same as in the case wherein analog component video signals are reproduced. Data outputted from the ECC circuit 14 are supplied to the interface block 18 by way of the switching circuit 15. The interface block 18 returns the thus supplied data into important data and ordinary data of an ATV signal and supplies them to the ATV codec 17. The ATV codec 17 converts the received important data and ordinary data back into data of the format of the original ATV signal and outputs the resulted data to the circuit not shown.

Figure 1B:
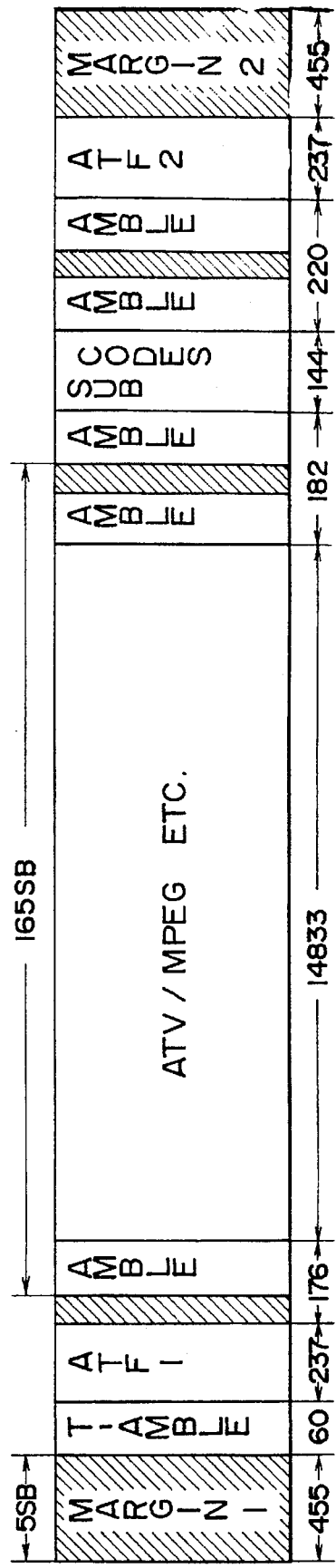

FIG. 1(b) shows an example of a track format recorded in this manner. As shown in FIG. 1(b), in the present embodiment, upon recording of analog component video signals, digital data are continuously recorded from the area in which a digital audio signal is recorded to the area in which a digital video signal is recorded. Accordingly, the recording capacity (182 bytes) of the IBG and amble portions can be used effectively. Further, since the capacity of the portions is equal to an integral number of times the one synchronizing block length (91 bytes), any sub code area or ATF area need not be displaced at all.

It is to be noted that, while analog component video signals and TV data are recorded in the embodiment described above, the digital signal recording and reproducing apparatus may be constructed otherwise so as to record digital data of the MPEG system, output data of a computer or some other data.

Further, since data of the ATV system or any other system are not recorded into a recording area for sub codes in the embodiment described, the sum of IBG and amble areas between a recording area for a video signal and a recording area for sub codes need not be set to an integral number of times the synchronizing block length. Furthermore, if the capacity of the recording area for sub codes in the embodiment described above is set to an integral number of times the synchronizing block length (91 bytes), then data of the ATV system or some other system can be recorded also into the recording area for sub codes.

Further, the one synchronizing block length may naturally be different from 91 bytes.

Having now fully described the invention, it will be apparent to one of ordinary skill in the art that many changes and modifications can be made thereto without departing from the spirit and scope of the invention as set forth herein.

What is claimed is:

1. A digital magnetic recording and/or reproducing apparatus which converts an input digital image signal into high efficiency codes and further into variable length codes and then records the thus obtained variable length codes, comprising:

means for reducing the amount of data representing a predetermined period shorter than one frame period, which data is a variable length coding output, to an amount smaller than a predetermined amount;

means for quantizing the image data converted into high efficiency codes with a particular quantization step;

synchronizing block conversion means for converting the variable length coding output representing the predetermined period into a construction of synchronizing blocks defining the data area length of the synchronizing blocks so that the variable length coding output for the predetermined period whose data amount has been controlled is included in an integral number of synchronizing blocks;

information addition means for adding information of the quantization step for each of the synchronizing blocks; and means for recording an integral number of units of the quantized image data onto a track of a recording medium and recording or reproducing a plurality of different digital signals, including video, audio, or advanced television system data in a spaced relationship from each other by a distance equal to an integral number times the synchronizing block length on the track of the recording medium, said plurality of different digital signals having a same synchronizing block length.

2. A digital magnetic recording and/or reproducing apparatus according to claim 1, wherein the synchronizing blocks are provided between the audio signal and the video signal.

3. A digital magnetic recording and/or reproducing apparatus according to claim 2, wherein the synchronizing blocks are provided at each of the beginnings and the ends of the audio signal and the video signal.

4. A digital magnetic recording and/or reproducing apparatus according to claim 3, wherein sub codes are recorded at the end of the video signal and the synchronizing blocks are provided at the end of the sub codes.

* * * * *